US010007853B2

(12) United States Patent
Takeda et al.

(10) Patent No.: US 10,007,853 B2
(45) Date of Patent: Jun. 26, 2018

(54) IMAGE GENERATION DEVICE FOR MONITORING SURROUNDINGS OF VEHICLE

(71) Applicant: AISIN SEIKI KABUSHIKI KAISHA, Kariya-shi, Aichi (JP)

(72) Inventors: Shoko Takeda, Yokkaichi (JP); Kazuya Watanabe, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 358 days.

(21) Appl. No.: 14/353,085

(22) PCT Filed: Oct. 24, 2012

(86) PCT No.: PCT/JP2012/077487
§ 371 (c)(1),
(2) Date: Apr. 21, 2014

(87) PCT Pub. No.: WO2013/077138
PCT Pub. Date: May 30, 2013

(65) Prior Publication Data

US 2014/0247358 A1 Sep. 4, 2014

(30) Foreign Application Priority Data

Nov. 24, 2011 (JP) ................................ 2011-256530

(51) Int. Cl.
*H04N 7/18* (2006.01)
*G06K 9/00* (2006.01)
(Continued)

(52) U.S. Cl.
CPC ............ *G06K 9/00791* (2013.01); *B60R 1/00* (2013.01); *G06T 3/0062* (2013.01); *G06T 5/006* (2013.01);
(Continued)

(58) Field of Classification Search
IPC ................................................ B60R 2300/108
See application file for complete search history.

(56) References Cited

U.S. PATENT DOCUMENTS 8,115,810 B2 2/2012 Yoneji
2005/0249379 A1 11/2005 Yoshimura
(Continued)

FOREIGN PATENT DOCUMENTS

JP 2002-140703 A 5/2002
JP 2005-311868 A 11/2005
(Continued)

OTHER PUBLICATIONS

English translation of International Preliminary Report on Patentability for PCT/JP2012/077487 dated Jun. 19, 2014.
(Continued)

*Primary Examiner* — Tracy Y Li
(74) *Attorney, Agent, or Firm* — Sughrue Mion, PLLC

(57) ABSTRACT

Provided is an image generation device that can generate a monitor display image suited for monitoring surroundings of a vehicle, even from an image captured using a wide-angle lens, such as a fisheye lens. Such an image generation device includes: an input unit to which a captured image of the surroundings of the vehicle is input, the captured image being acquired by a vehicle-mounted camera equipped with a wide-angle lens and being distorted; a setting unit that sets specific correction values for respective regions of the captured image that are separated by a reference line at a predetermined interval along a vertical direction of the captured image, the specific correction values being calculated based on a reference correction value of the wide-angle lens along the vertical direction of the captured image, the reference line extending in a horizontal direction of the captured image; an execution unit that applies distortion correction to the captured image using the specific correc-
(Continued)

ORIGINAL SCENE
CAPTURED IMAGE
CORRECTED CAPTURED IMAGE
SECOND CAPTURED IMAGE REGION (CORRECTION INTENSITY: SMALL)
REFERENCE LINE
FIRST CAPTURED IMAGE REGION (CORRECTION INTENSITY: LARGE)
CORRECTED CAPTURED IMAGE
THIRD CAPTURED IMAGE REGION
REFERENCE LINE
SECOND CAPTURED IMAGE REGION
FIRST CAPTURED IMAGE REGION
CENTER OF IMAGE CAPTURE
PIXEL tion values set by the setting unit; and an output unit that outputs, to a monitor, the captured image to which the distortion correction has been applied by the execution unit.

16 Claims, 4 Drawing Sheets

(51) Int. Cl.
*B60R 1/00* (2006.01)
*G06T 5/00* (2006.01)
*G06T 3/00* (2006.01)

(52) U.S. Cl.
CPC .......... *H04N 7/18* (2013.01); *B60R 2300/105* (2013.01); *B60R 2300/304* (2013.01); *G06T 2207/30252* (2013.01)

(56) References Cited

U.S. PATENT DOCUMENTS

2005/0270496 A1* 12/2005 Mochizuki ........... G03B 21/132 353/70
2007/0041661 A1* 2/2007 Hung ..................... H04N 5/202 382/295
2007/0147706 A1* 6/2007 Sasaki ................ H04N 5/23248 382/295
2010/0110189 A1 5/2010 Kuboyama et al.
2010/0110234 A1* 5/2010 Kaneko ................... G06T 11/60 348/241
2010/0283864 A1* 11/2010 Kawai ....................... G06T 1/00 348/222.1
2011/0013021 A1* 1/2011 Hongo ...................... B60R 1/00 348/148

FOREIGN PATENT DOCUMENTS

JP 2008-140401 A 6/2008
JP 2008-301052 A 12/2008
JP 2009-12652 A 1/2009
JP 4606336 B2 1/2011

OTHER PUBLICATIONS

Communication dated Jun. 18, 2015, issued by the Japanese Patent Office in counterpart Japanese application No. 2011-256530.
International Search Report for PCT/JP2012/077487 dated Jan. 22, 2013.

* cited by examiner

GROUP OF VEHICLE STATE DETECTION SENSORS
23
PROCESSING MODULE
PS
POWER STEERING UNIT
T
TRANSMISSION
BK
BRAKE DEVICE
21T
TOUCHSCREEN
MONITOR
21
22
20
DRIVING ASSISTANCE IMAGE PROCESSING UNIT
70
COMMUNICATION INTERFACE
71
DISPLAY CONTROL UNIT
72
AUDIO PROCESSING MODULE
60
OPERATION INPUT PROCESSING UNIT
50
IMAGE PROCESSING MODULE
1(1a~1d)
CAMERA

CPU
60
OPERATION INPUT PROCESSING UNIT
71
DISPLAY CONTROL UNIT
21T
21
50
IMAGE PROCESSING MODULE
59
FRAME MEMORY
58
OUTPUT UNIT
52
PREPROCESSING UNIT
51
CAPTURED IMAGE MEMORY
53
TEMPLATE IMAGE OUTPUT UNIT
54
DISPLAY IMAGE GENERATION UNIT (EXECUTION UNIT)
55
MAPPING TABLE SETTING UNIT (SETTING UNIT)
56
MAPPING TABLE
57
DISPLAY IMAGE SELECTION UNIT
1a
1b
1c
1d

DISPLAY VIEW SELECTION INSTRUCTION
CORRECTION CODE
DISPLAY IMAGE SELECTION UNIT
57
21
MAPPING TABLE FOR FRONT VIEW
(600, 50, ch1)
(100, 250, ch1)
(50, 200, ch1)
FRONT CAPTURED IMAGE
CAPTURED IMAGE
ch1
ch2
ch3
ch4

IMAGE GENERATION DEVICE FOR MONITORING SURROUNDINGS OF VEHICLE

CROSS REFERENCE TO RELATED APPLICATIONS

This application is a National Stage of International Application No. PCT/JP2012/077487 filed Oct. 24, 2012, claiming priority based on Japanese Patent Application No. 2011-256530 filed Nov. 24, 2011, the contents of all of which are incorporated herein by reference in their entirety.

TECHNICAL FIELD

The present invention relates to an image generation device for monitoring surroundings of a vehicle, which generates a monitor display image to be displayed on an in-vehicle monitor by applying predetermined image processing to images of the surroundings of the vehicle captured by cameras mounted on the vehicle.

BACKGROUND ART

There are limitations on the positions and the number of cameras mounted on a vehicle. In order to eliminate blind spots in image capture to the greatest extent possible under such limitations, vehicles are provided with wide-angle lenses, such as fisheye lenses, that can capture the widest possible range of the vehicles' surroundings at once. However, in an image captured using a wide-angle lens, such as a fisheye lens, a subject is distorted in a circular shape, and the distortion intensifies toward an outer edge of the captured image. Such lens distortion can be resolved by correction conforming to correction parameters suited for the lens characteristics. However, application of intense distortion correction unfavorably makes invisible the surrounding areas that have been advantageously captured.

There is a demand for an image for monitoring the surroundings of a vehicle at the time of, for example, parallel parking and garage parking. It is desired that such an image shows edges of a vehicle body in real space and straight lines parallel to these edges of the vehicle body while maintaining their original parallelism to the greatest extent possible. In order to address this desire, Patent Document 1 describes a periphery monitoring device that applies distortion correction processing to a captured image including edges of a vehicle body such that parallel perception is similar to that in real space, and displays the resultant image on a monitor. More specifically, this periphery monitoring device includes: a coordinate axes setting unit for setting, in an image captured by a camera, a first axis along an edge of a vehicle body and a second axis orthogonal to the first axis, the camera being disposed so as to include the edge of the vehicle body in the captured image; and a distortion correction processor for enlarging the captured image at a magnification ratio that increases in the second axis direction in a nonlinear fashion that depends on the distance from the second axis while the first axis direction is kept substantially fixed, wherein the captured image that has been corrected for distortion by the distortion correction processor is displayed on a display device.

However, distortion correction processing of this periphery monitoring device is modification in which horizontal pixel rows composing the captured image are merely enlarged at different magnification ratios in accordance with their positions in the vertical direction. Therefore, this is insufficient as lens distortion correction for an ultra wide-angle lens, such as a fisheye lens. Furthermore, correction parameters are magnification ratios that are uniquely determined by the positions in the vertical direction. As horizontal pixel rows are merely enlarged in accordance with these magnification ratios, there is a possibility that desired distortion correction cannot be applied.

PRIOR ART DOCUMENTS

Patent Documents

Patent Document 1: JP 2009-012652A (paragraphs [0015] to [0038] and FIG. 2)

DISCLOSURE OF INVENTION

Problem to be Solved by the Invention

In view of the above-described issues, there is a demand for an image generation device for monitoring the surroundings of a vehicle that can generate a monitor display image suited for monitoring the surroundings of the vehicle, even from an image captured using a wide-angle lens, such as a fisheye lens.

Means for Solving Problem

In order to solve the above problems, an image generation device for monitoring surroundings of a vehicle according to the present invention includes: an input unit to which a captured image of the surroundings of the vehicle is input, the captured image being acquired by a vehicle-mounted camera equipped with a wide-angle lens and being distorted; a setting unit that sets specific correction values for respective regions of the captured image that are separated by a reference line at a predetermined interval along a vertical direction of the captured image, the specific correction values being calculated based on a reference correction value of the wide-angle lens along the vertical direction of the captured image, the reference line extending in a horizontal direction of the captured image; an execution unit that applies distortion correction to the captured image using the specific correction values set by the setting unit; and an output unit that outputs, to a monitor, the captured image to which the distortion correction has been applied by the execution unit.

According to this configuration, in a captured image targeted for correction, specific correction values are first set in one-to-one correspondence with captured image regions that are separated by a reference line along the vertical direction. Here, the specific correction values are set based on a reference correction value of a wide-angle lens used for the captured image. That is to say, while a correction amount by which lens distortion should be corrected can be calculated from the lens characteristics of the wide-angle lens and from the direction of image capture (determined by the orientation in which the camera is installed), the specific correction values determine the extent to which this correction amount is applied. Therefore, by setting different specific correction values for the respective captured image regions separated along the vertical direction, correction can be applied using different specific correction values for an area close to the camera and an area far from the camera. This makes it possible to apply appropriate correction differently depending on a distance between the camera and a subject that a driver particularly wants to check through a monitor. It should be noted that the distortion correction is applied to lens distortion in the vertical direction for the following reason: such distortion correction straightens curved lines in the horizontal direction, thereby ensuring a preferable perception of perspective for the driver.

To apply the distortion correction on a per-pixel basis, in one preferred embodiment of the present invention, the setting unit sets a mapping table composed of per-pixel mapping data that is determined by the specific correction values, and the distortion correction is applied using the set mapping table. A corrected image is determined in advance from a correction amount for lens distortion and from the specific correction values of the respective captured image regions, which represent the extent to which this correction amount is applied. Therefore, the mapping data is obtained by comparing a pre-correction image, which is a captured image, with a corrected image displayed on the monitor, and by calculating, in advance, pixel positions in the corrected image to which pixels in the pre-correction image correspond. The mapping table is obtained by expressing this mapping data in a form of a table. By transferring pixels in the captured image to pixels in the corrected image displayed on the monitor with use of this mapping table, the distortion-corrected captured image is generated. If pixels in the captured image do not correspond to pixels in the display image, that is to say, if empty pixels are present at transfer destinations, it is preferable to fill the empty pixels by interpolation operation.

When the captured image is separated into a larger number of regions for which the specific correction values can be set in one-to-one correspondence, an image displayed on the monitor is easier for the driver to view. For this reason, in a preferred embodiment of the present invention, the reference line is set in plurality.

With regard to a captured image region showing an area far from the vehicle, it is preferable to take advantage of the widest possible image capture range, which is the characteristics of the wide-angle lens, without any change. Therefore, in one preferred embodiment of the present invention, the specific correction value set for a captured image region showing a first surrounding area that is distant from the vehicle by a predetermined distance is smaller than the specific correction value set for a captured image region showing a second surrounding area that is closer to the vehicle than the first surrounding area is. At this time, depending on circumstances, it is effective to set the specific correction value set for a captured image region showing a first surrounding area that is distant from the vehicle by a predetermined distance to zero.

A front view is expected to present a relatively wide field of view (image). A side view is expected to present an undistorted field of view in the vicinity of a vehicle body. A rear view is expected to present a relatively accurate perception of perspective. In this manner, screens for monitoring the entire surroundings of the vehicle are expected to show different forms of images. For this reason, in one preferred embodiment of the present invention, the captured image includes a front captured image showing surroundings of a front of the vehicle, a side captured image showing surroundings of a side of the vehicle, and a rear captured image showing surroundings of a rear of the vehicle, and at least one among the reference line and the specific correction values is set for the respective captured images. Furthermore, it is possible to generate the distortion-corrected captured image that covers the entire surroundings of the vehicle by combining these front captured image, side captured image, and rear captured image, and to display such a distortion-corrected captured image on the monitor, within a scope of the present invention.

BEST MODE FOR CARRYING OUT THE INVENTION

Figure 1:
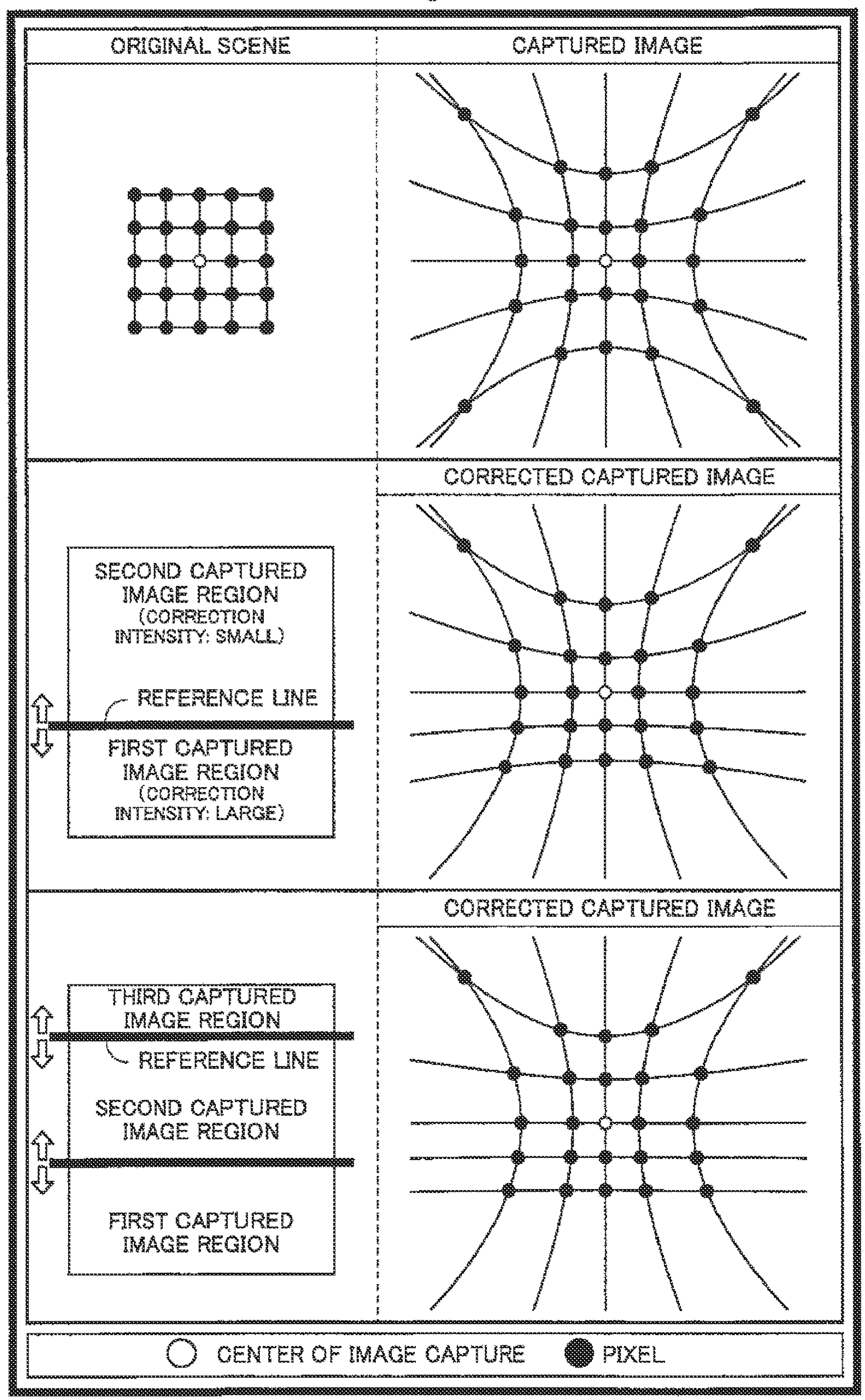
FIG. 1 is a schematic explanatory diagram showing a fundamental principle of distortion correction used by an image generation device for monitoring surroundings of a vehicle according to the present invention.

Before describing a specific embodiment of the present invention, the following describes a fundamental principle of correction processing for distortion of a wide-angle lens (e.g., a fisheye lens) used in the present invention with reference to a schematic diagram of FIG. 1. In order to facilitate the understanding of the description, FIG. 1 shows the original scene captured as a subject by a vehicle-mounted camera in a form of a grid. Here, a grid point indicated by a white circle represents the center of image capture. The captured image is acquired by a camera provided with a wide-angle lens, which is equivalent to a fisheye lens, capturing this original scene. In order to facilitate the understanding of distortion thereof, specific positions (pixels) corresponding between the original scene and the captured image are indicated by black circles.

In lens distortion correction for the captured image, pixels in the captured image are moved based on correction parameters suited for the characteristics of the provided wide-angle lens so as to resolve lens distortion in a vertical direction thereof (so as to straighten curved lines in a horizontal direction). However, as complete removal of the lens distortion cancels out the advantageous effects of the wide-angle lens, a degree of correction, that is to say, correction intensity is set. It is assumed herein that the correction intensity of "zero" implies no correction, whereas the correction intensity of "one" implies complete correction in which straight lines that have turned into curved lines due to the wide-angle lens are corrected and restored to straight lines. In the present invention, such a degree of distortion correction, that is to say, correction intensity is set to be different between upper and lower regions separated by a reference line that has been set to extend in a horizontal direction of the captured image. For instance, these upper and lower regions respectively correspond to a first captured image region and a second captured image region in an example shown in the middle part of FIG. 1. In general, with regard to the vicinity of a vehicle, the correction intensity is increased and straight lines are shown such that they appear as straight lines to realize an accurate perspective of distances to objects. For example, bumpers are displayed with straight lines that resemble their real shapes to the greatest extent possible. On the other hand, with regard to areas distant from the vehicle, a wide field of view is more important than the accurate positions of individual objects, and hence the effects of the wide-angle lens are utilized to the greatest extent possible by setting the correction intensity therefore to be close to zero. Therefore, in normal distortion correction, a large correction intensity is set for the first captured image region, and a small correction intensity is set for the second captured image region. It should be noted, however, that the present invention does not exclude the reverse distortion correction in which a small correction intensity is set for the first captured image region, and a large correction intensity is set for the second captured image region.

These captured image regions, for which correction intensities for distortion correction are set in one-to-one correspondence, are not limited to being separated by one reference line. It is permissible to separate the captured image into three or more captured image regions by setting a plurality of reference lines, and set correction intensities for the respective captured image regions. For instance, in an example shown in the lower part of FIG. 1, the captured image is separated into a first captured image region, a second captured image region, and a third captured image region by two reference lines. In this captured image, correction intensities are set to decrease from the bottom to the top. Therefore, in a corrected captured image, horizontal grid lines are substantially straightened in a lower region, while horizontal grid lines remain as curved lines and a wide field of view is maintained for image capture in an upper region.

In the distortion correction exemplarily shown in FIG. 1, distortion correction is applied with respect to lens distortion in the vertical direction of the captured image. It should be noted, however, that the present invention does not exclude application of distortion correction with respect to lens distortion in the horizontal direction at the same time, that is to say, correction for straightening curved lines in the vertical direction.

Figure 2:
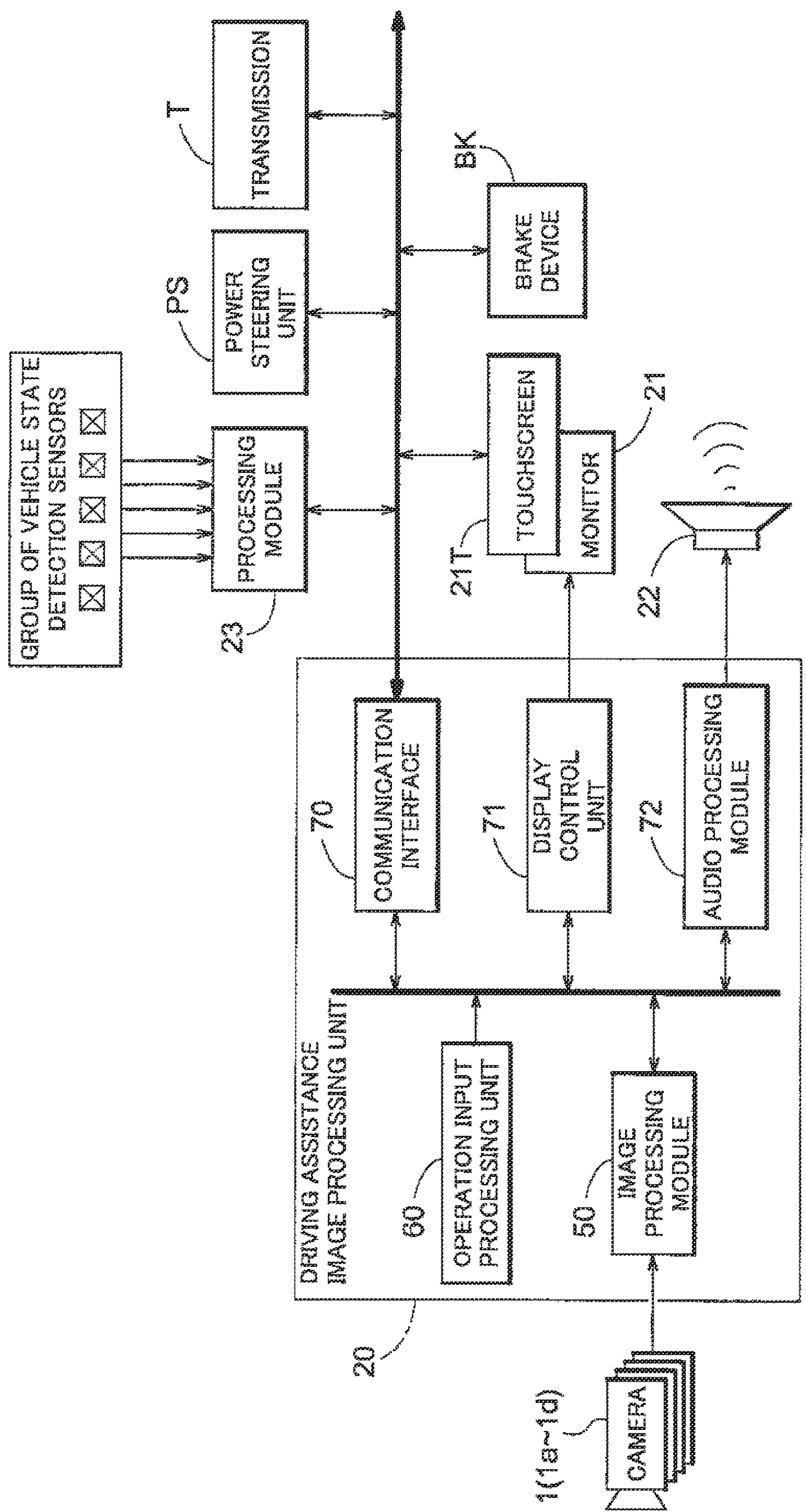
FIG. 2 is a functional block diagram showing a part of a driving electronic system of a vehicle surroundings monitoring device equipped with the image generation device for monitoring surroundings of the vehicle according to the present invention.

A specific embodiment of the present invention will now be described based on the drawings. FIG. 2 is a functional block diagram showing a part of a driving electronic system of a vehicle surroundings monitoring device equipped with an image generation device for monitoring the surroundings of a vehicle according to the present invention.

A vehicle provided with this vehicle surroundings monitoring device has four vehicle-mounted cameras 1, that is to say, a front camera 1*a*, a back camera 1*d*, a left side camera 1*b*, and a right side camera 1*c*. The following images are generated from captured images from these vehicle-mounted cameras 1: a front view image, a rear view image, a side view image, an overhead image, and a multi-view image made up of a combination thereof. In the following description, these vehicle-mounted cameras 1*a*, 1*b*, 1*c*, 1*d* may simply be referred to as cameras 1 in a collective manner where appropriate. During the operations of vehicle surroundings monitoring control, a captured image from the cameras 1 or an overhead image generated using this captured image is displayed on a monitor. The cameras 1 are digital cameras that apply digital conversion to images obtained by capturing the surroundings of the vehicle in chronological order, and output the resultant images in real time. The cameras 1 are equipped with wide-angle lenses equivalent to fisheye lenses.

A processing module 23 composing this vehicle electronic system is connected to a group of vehicle state detection sensors that detect the states of driving operations and running of the vehicle, and outputs signals input from the group of vehicle state detection sensors either as-is or after evaluating the same. Although not shown in the drawings, the group of vehicle state detection sensors includes, for example, a steering sensor that measures a direction of a steering operation (steering direction) and an amount of the operation (steering amount), a shift position sensor that distinguishes a shift position of a shift lever, an accelerator sensor that measures an amount of operation of an accelerator pedal, a brake sensor that detects an amount of operation of a brake pedal, and a distance sensor that detects a travelled distance of the vehicle.

A driving assistance image processing unit 20, which forms the core of the vehicle surroundings monitoring device, includes various functional units configured in a form of hardware and/or software. Among these, functional units that are particularly relevant to the present invention are, for example, an image processing module 50, an operation input processing unit 60, a communication interface 70, a display control unit 71, and an audio processing module 72. The operation input processing unit 60 issues control instructions to various functional units configured in the driving assistance image processing unit 20 based on operation instructions that have been input by a driver via a touchscreen 21T and other types of switches. The communication interface 70 is used as an input/output interface for a vehicle-mounted LAN, and is connected to control units, such as the processing module 23, the touchscreen 21T, a power steering unit PS, a transmission T, and a brake device BK, in such a manner that the communication interface 70 can transmit data thereto. In addition, a monitor 21 and a speaker 22 are also provided as a device for outputting visual information and a device for outputting audio information, respectively. An image generated by the image processing module 50 for display on the monitor (monitor display image) is converted into a video signal and then transmitted to the monitor 21 by the display control unit 71. An audio guide and emergency warning sound generated by the audio processing module 72 are output from the speaker 22.

Figure 3:
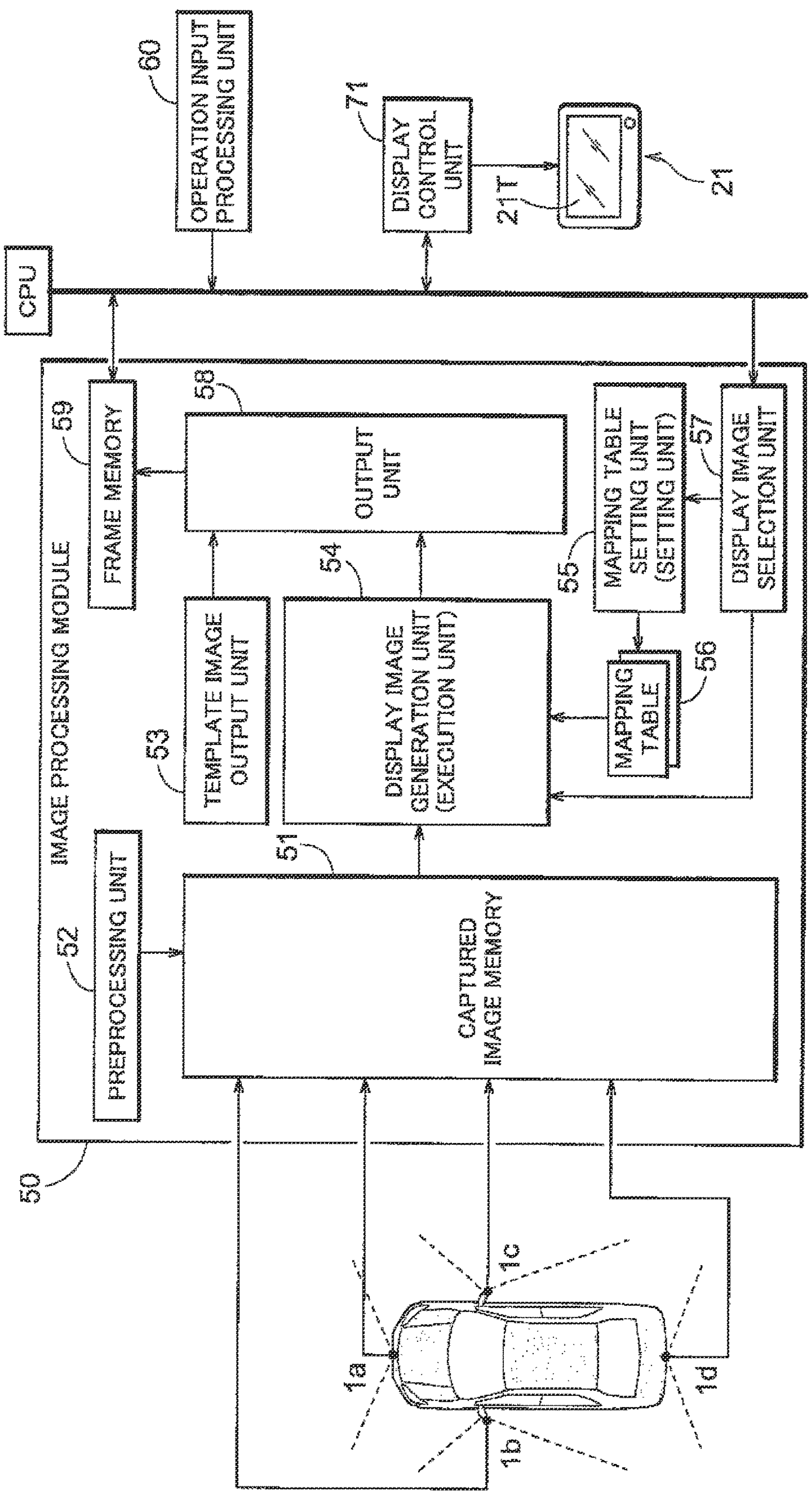
FIG. 3 is a functional block diagram of an image processing module composing the vehicle surroundings monitoring device.

FIG. 3 is a functional block diagram showing the image processing module 50 of the driving assistance image processing unit 20. The image processing module 50 has a function of generating various monitor display images from captured images acquired by the cameras 1 that capture the surroundings of the vehicle.

The image processing module 50 includes a captured image memory 51, a preprocessing unit 52, a template image output unit 53, a display image generation unit 54, a mapping table setting unit 55, a mapping table 56, a display image selection unit 57, an output unit 58, and a frame memory 59. Captured images acquired by the cameras 1 are deployed to the captured image memory 51, which serves as an image input unit. The preprocessing unit 52 adjusts luminance balances, color balances, and the like among the captured images individually acquired by the cameras 1.

The template image output unit 53 outputs template images as image frames suited for a display layout in which generated monitor display images are displayed on the monitor 21. The template images include, for example, an overhead image of the vehicle for demonstrating the position of the vehicle at the time of generating an overhead image of the surroundings as a monitor display image. The overhead image of the vehicle may be a photograph, an illustration, and the like. The template images are also used as masks for various view screens, such as a front view screen and a rear view screen.

The mapping table setting unit 55 calculates mapping data for monitor display images generated by the display image generation unit 54, and sets the calculated mapping data in the mapping table 56. In the present embodiment, the mapping table setting unit 55 also functions as a setting unit that sets magnitudes of per-pixel distortion correction amounts for correcting lens distortion of a wide-angle lens provided to a camera that has output a captured image in a vertical direction. Here, the magnitudes of the per-pixel distortion correction amounts are set in one-to-one correspondence with captured image regions that are separated along a vertical direction of the captured image by a reference line extending in a horizontal direction of the captured image. That is to say, the mapping data set in the mapping table 56 is calculated using the correction intensity for adjusting a correction amount for correcting lens distortion described with reference to FIG. 1 as one parameter. Therefore, this mapping data shows correspondence relationships between pixels in a captured image and pixels in a monitor display image in consideration of distortion correction in the case where the captured image is converted into the monitor display image. Furthermore, this mapping table 56 is mutually used for monitor display images for various view screens, such as a front view screen and a rear view screen. For this reason, position addresses, which are equivalent to pixel positions in monitor display images, include not only coordinate positions of corresponding pixels retrieved from captured images targeted for processing, but also identifiers for identifying the cameras of the captured images.

Therefore, the mapping table 56 is constituted by a memory with a size adequate for all monitor display images displayed on the monitor 21, and stores mapping data that is written and rewritten by the mapping table setting unit 55.

With use of the mapping table 56, the display image generation unit 54 generates a predetermined monitor display image to be displayed on the monitor 21 using a captured image that has been deployed to the captured image memory 51 as a conversion source image. The mapping data set in the mapping table 56 has been generated in consideration of correction of lens distortion with respect to a captured image at the correction intensities that have been set in one-to-one correspondence with the captured image regions separated along the vertical direction. Therefore, when the predetermined monitor display image is generated with use of the mapping table 56, distortion correction is applied at the same time. Therefore, this display image generation unit 54 also functions as an execution unit.

The display image selection unit 57 determines a vehicle surroundings monitoring screen to be displayed on the monitor 21 based on a manual control instruction transmitted via the operation input processing unit 60 and on a control signal transmitted from a vehicle driving control unit, which is not shown in the drawings. The display image selection unit 57 also requests the template image output unit 53 and the display image generation unit 54 to output a template image and generate a monitor display image used therefore.

Figure 4:
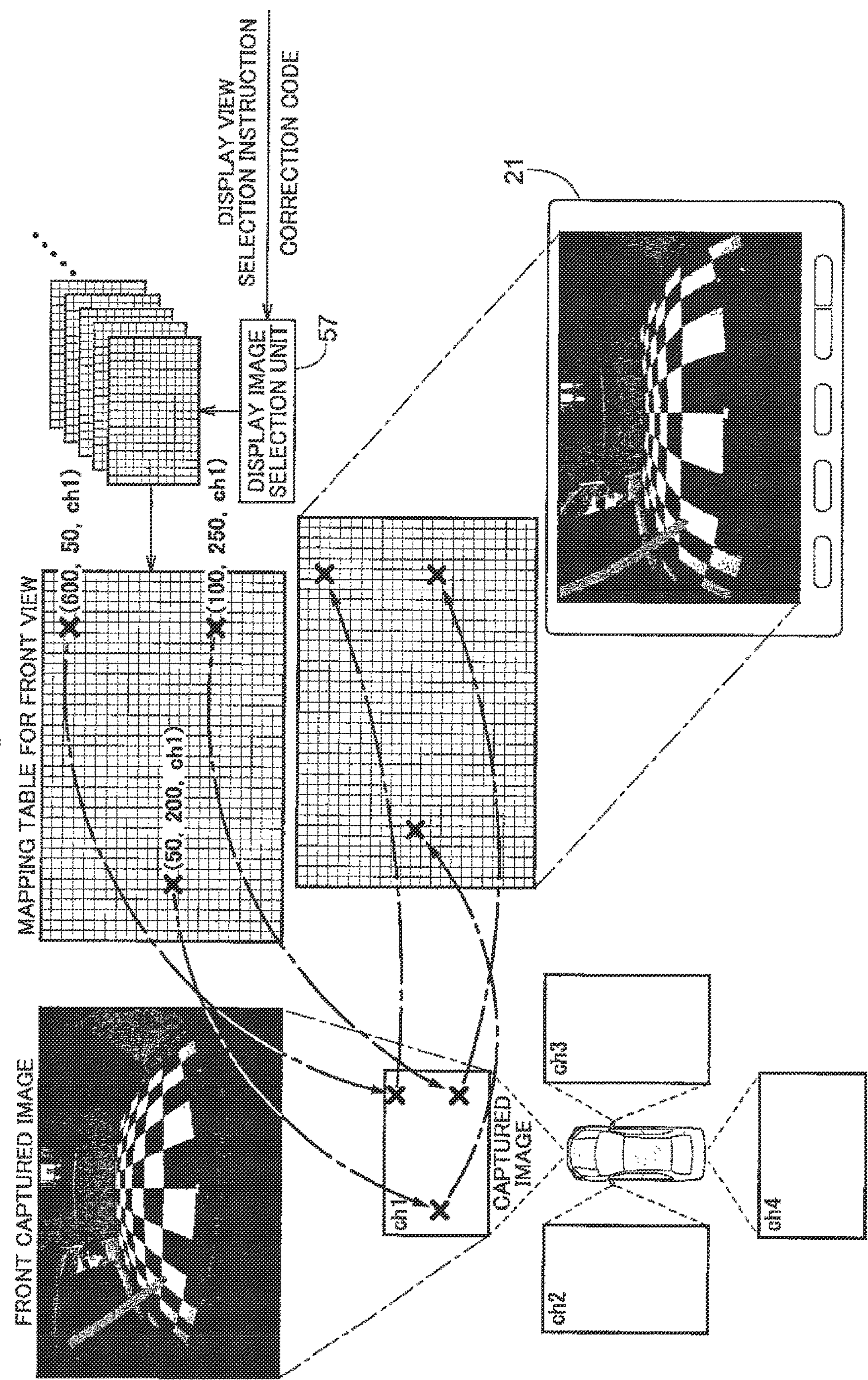
FIG. 4 is a schematic diagram illustrating a process of distortion correction using a mapping table.

FIG. 4 illustrates a process of distortion correction applied by the display image generation unit 54, which also functions as the execution unit, with use of the mapping table 56. In this illustrated example, the display image selection unit 57 is requested to display a monitor display image based on a front captured image on the monitor 21 via a display view selection instruction for ordering a selection of a display view screen. At the same time, the display image selection unit 57 is also provided with a correction code for designating a distortion correction type for the front captured image, which has been set either as a default or manually. This distortion correction type is defined by the captured image regions separated by the reference line and by the correction intensities that have been set in one-to-one correspondence with the captured image regions. In one specific example, groups of mapping data are generated and stored in advance in one-to-one correspondence with types of captured images (types of the cameras 1) based on a plurality of correction intensity levels. Then, from among the groups of mapping data, a group of mapping data that matches a type of a captured image to be used (front captured image) and matches the correction intensities which have been set in one-to-one correspondence with the captured image regions is extracted. Combinations from the extracted group of mapping data are set in the mapping table 56 for application to the separated captured image regions. In this way, the mapping table 56 serves as a mapping table for front view in which a group of mapping data used for application of predetermined distortion correction has been set. That is to say, the mapping data set as elements of this mapping table for front view, which is for converting the front captured image into a monitor display image while applying distortion correction thereto, defines which of the pixels in the front captured image should be transferred for target pixels in the monitor display image. Depending on circumstances, the mapping data may define interpolated values of a plurality of pixels.

The output unit 58 generates a final monitor display image by executing composition processing for fitting, for example, a monitor display image generated by the display image generation unit 54 into a template image output from the template image output unit 53, that is to say, an image frame, and transfers the final monitor display image to the frame memory 59. The monitor display image transferred to the frame memory 59 is displayed on the monitor 21 by the display control unit 71.

OTHER EMBODIMENTS (1) While the display image generation unit 54 also functions as the execution unit in the above-described embodiment, the execution unit may be configured independently from the display image generation unit 54. Such an execution unit sets mapping data that is used only for distortion correction in the mapping table 56, and applies distortion correction to a captured image deployed to the captured image memory 51 with use of the mapping table 56. The corrected captured image is used by the display image generation unit 54 as a source image for generating a monitor display image.

(2) Predetermined reference lines and predetermined specific correction values may be set in advance so that a user can select them. The user may set them arbitrarily.

(3) The present invention embraces not only the image conversion in which a monitor display image is generated by applying distortion correction to a conversion source image consisting of a captured image from one specific camera, but also generation of an overhead image of the entire surroundings as viewed from above using conversion source images consisting of captured images from a plurality of cameras. Furthermore, it is possible to generate, with use of a similar mapping table 56, a monitor display image made up of a combination of the following images: an overhead image based on source images consisting of captured images from a front camera, a back camera, and left and right side cameras; and a front view image based on a source image consisting of a captured image from the front camera.

(4) In the above-described embodiment, the functions realized especially by the template image output unit 53, the display image generation unit 54, the mapping table setting unit 55, the display image selection unit 57, the output unit 58, and the like configured in the image processing module 50 are represented by blocks in order to facilitate the understanding of the description. However, the form of representation by blocks can be changed arbitrarily. For example, the template image output unit 53 and the output unit 58 may be formed integrally, and a template image may also be generated with use of a mapping table. Furthermore, the mapping table setting unit 55 and the display image selection unit 57 may be formed integrally.

INDUSTRIAL APPLICABILITY

The present invention can be used in any technology for monitoring the surroundings of a vehicle using a monitor display image based on a captured image.

REFERENCE SIGNS LIST

1 camera
21 monitor
50 image processing module
51 captured image memory (input unit)
53 template image output unit
54 display image generation unit (execution unit)
55 mapping table setting unit (setting unit)
56 mapping table
57 display image selection unit
58 output unit
59 frame memory
60 operation input processing unit
71 display control unit

The invention claimed is:

1. An image generation device for monitoring surroundings of a vehicle, comprising:

an input unit to which a captured image of the surroundings of the vehicle is input as a distortion-uncorrected captured image, including distortion in a vertical direction and distortion in a horizontal direction, the captured image being acquired by at least one vehicle-mounted camera equipped with a wide-angle lens and being distorted, the captured image including a plurality of regions;

a setting unit that sets a specific correction value for each of the regions of the captured image that are separated by a reference line at a predetermined interval along the vertical direction of the captured image, the specific correction value being calculated based on a predetermined reference correction value of the wide-angle lens along the vertical direction of the captured image, the reference line extending in a horizontal direction of the captured image;

an execution unit that applies distortion correction in only the vertical direction and not in the horizontal direction to each of the regions of the captured image using the specific correction value for the respective region set by the setting unit; and an output unit that outputs, to a monitor, the captured image to which the distortion correction has been applied by the execution unit.

2. The image generation device for monitoring surroundings of the vehicle according to claim 1, wherein the setting unit sets a mapping table composed of per-pixel mapping data that is determined by the specific correction values, and the distortion correction is applied using the set mapping table.

3. The image generation device for monitoring surroundings of the vehicle according to claim 1, wherein the reference line is set in plurality.

4. The image generation device for monitoring surroundings of the vehicle according to claim 1, wherein the specific correction value set for a captured image region showing a first surrounding area that is distant from the vehicle by a predetermined distance is smaller than the specific correction value set for a captured image region showing a second surrounding area that is closer to the vehicle than the first surrounding area is.

5. The image generation device for monitoring surroundings of the vehicle according to claim 1, wherein the specific correction value set for a captured image region showing a first surrounding area that is distant from the vehicle by a predetermined distance is set to zero.

6. The image generation device for monitoring surroundings of the vehicle according to claim 1, wherein the captured image includes a front captured image showing surroundings of a front of the vehicle, a side captured image showing surroundings of a side of the vehicle, and a rear captured image showing surroundings of a rear of the vehicle, and at least one among the reference line and the specific correction value is set for the respective captured images.

7. The image generation device for monitoring surroundings of the vehicle according to claim 2, wherein the at least one vehicle-mounted camera comprises a plurality of the vehicle-mounted cameras equipped with wide-angle lenses, the reference line is formed in accordance with a mount condition of each of the plurality of vehicle-mounted cameras equipped with wide-angle lenses, the mapping table formed of distortion mapping data corresponding to each of the plurality of vehicle-mounted cameras equipped with wide-angle lenses is set by the setting unit based on the reference line, and the distortion correction is performed with use of the mapping table that has been set.

8. The image generation device for monitoring surroundings of the vehicle according to claim 7, wherein the mount condition is a tilt or mount position of the vehicle-mounted camera equipped with a wide-angle lens.

9. A method of generating an image for monitoring surroundings of a vehicle, comprising:

acquiring a captured image of the surroundings of the vehicle by at least one vehicle-mounted camera equipped with a wide-angle lens, wherein the captured image includes distortion in a vertical direction, distortion in a horizontal direction, and a plurality of regions;

inputting the captured image into an image processing unit as a distortion-uncorrected captured image;

setting a specific correction value for each of the regions of the captured image that are separated by a reference line at a predetermined interval along the vertical direction of the captured image, the specific correction value being calculated based on a predetermined reference correction value of the wide-angle lens along the vertical direction of the captured image, the reference line extending in a horizontal direction of the captured image;

applying distortion correction in only the vertical direction and not in the horizontal direction to each of the regions of the captured image using the specific correction value for the respective region; and outputting the captured image to which the distortion correction has been applied to a monitor.

10. The method of generating an image for monitoring surroundings of a vehicle according to claim 9, further comprising:

setting a mapping table composed of per-pixel mapping data that is determined by the specific correction values; and applying the distortion correction using the set mapping table.

11. The method of generating an image for monitoring surroundings of a vehicle according to claim 10, wherein the captured image is acquired by a plurality of the vehicle-mounted cameras equipped with wide-angle lenses, the reference line is formed in accordance with a mount condition of each of the plurality of vehicle-mounted cameras equipped with wide-angle lenses, the mapping table formed of distortion mapping data corresponds to each of the plurality of vehicle-mounted cameras equipped with wide-angle lenses is set based on the reference line, and the distortion correction is performed using of the mapping table that has been set.

12. The method of generating an image for monitoring surroundings of a vehicle according to claim 11, wherein the mount condition is a tilt or mount position of the vehicle-mounted camera equipped with a wide-angle lens.

13. The method of generating an image for monitoring surroundings of a vehicle according to claim 9, wherein the reference line is set in plurality.

14. The method of generating an image for monitoring surroundings of a vehicle according to claim 9, wherein the specific correction value for a captured image region showing a first surrounding area that is distant from the vehicle by a predetermined distance that is set to be smaller than the specific correction value that is set for a captured image region showing a second surrounding area that is closer to the vehicle than the first surrounding area is.

15. The method of generating an image for monitoring surroundings of a vehicle according to claim 9, wherein the specific correction value for a captured image region showing a first surrounding area that is distant from the vehicle by a predetermined distance is set to be zero.

16. The method of generating an image for monitoring surroundings of a vehicle according to claim 9, wherein the captured image includes a front captured image showing surroundings of a front of the vehicle, a side captured image showing surroundings of a side of the vehicle, and a rear captured image showing surroundings of a rear of the vehicle, and at least one among the reference line and the specific correction value is set for the respective captured images.

* * * * *